(12) United States Patent
MacKenzie et al.

(10) Patent No.: US 11,477,700 B2
(45) Date of Patent: *Oct. 18, 2022

(54) MOBILE COMMUNICATIONS NETWORK (71) Applicant: British Telecommunications Public Limited Company, London (GB)

(72) Inventors: Richard MacKenzie, London (GB); Zaid Al-Daher, London (GB); Michael Fitch, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/085,328

(22) PCT Filed: Mar. 29, 2017

(86) PCT No.: PCT/EP2017/057474
§ 371 (c)(1),
(2) Date: Sep. 14, 2018

(87) PCT Pub. No.: WO2017/167838
PCT Pub. Date: Oct. 5, 2017

(65) Prior Publication Data
US 2019/0090163 A1 Mar. 21, 2019

(30) Foreign Application Priority Data

Mar. 31, 2016 (EP) .................................. 16163458
May 31, 2016 (EP) .................................. 16172341

(51) Int. Cl.
*H04W 36/00* (2009.01)
*H04W 28/02* (2009.01)
(Continued)

(52) U.S. Cl.
CPC ....... *H04W 36/0007* (2018.08); *H04L 1/0026* (2013.01); *H04W 4/06* (2013.01);
(Continued)

(58) Field of Classification Search
CPC ....... H04W 4/06; H04W 24/08; H04W 24/10; H04W 28/02; H04W 28/0231;
(Continued)

(56) References Cited

U.S. PATENT DOCUMENTS 7,363,039 B2  4/2008  Laroia et al.
7,885,235 B2  2/2011  Mochizuki et al.
(Continued)

FOREIGN PATENT DOCUMENTS

CN  101331779 A  12/2008
CN  101584175 A  11/2009
(Continued)

OTHER PUBLICATIONS

3GPP TR 23.768 V12.1.0 (Jun. 2014), "Study on Architecture Enhancements to Support Group Communication System Enablers for LTE (GCSE_LTE)," Technical Report, 3rd Generation Partnership Project, Technical Specification Group Services and System Aspects (Release 12), Jun. 2014, 63 pages.
(Continued)

*Primary Examiner* — Chi H Pham
*Assistant Examiner* — Weibin Huang
(74) *Attorney, Agent, or Firm* — Patterson Thuente IP (57) ABSTRACT

A method of operating a mobile communications network including a plurality of base stations and a base station for a mobile communications network, wherein the base station includes a plurality of transmitters, a plurality of receivers and a processor, is disclosed. Each transmitter is configured to transmit radio signals to a plurality of mobile terminals. Each receiver is configured to receive radio signals from a
(Continued)

plurality of mobile terminals. The processor is configured to serve a mobile terminal via the transmitter over multicast/broadcast across a radio link; receive information from the mobile terminal being served by the transmitter, in which the information derives from signal quality of a multicast/broadcast serving signal received at the mobile terminal from the transmitter; and provide to the mobile terminal first instructions based on a first comparison of the quality of the multicast/broadcast serving signal received at the mobile terminal. The comparison is based on a first threshold; in which the first instructions instruct the mobile terminal to switch to unicast; and in which the processor is further configured to vary the first threshold in dependence on a measure of loading of the network.

13 Claims, 4 Drawing Sheets

(51) Int. Cl.
| | | |
|---|---|---|
| *H04W 36/30* | (2009.01) | |
| *H04W 72/00* | (2009.01) | |
| *H04W 88/06* | (2009.01) | |
| *H04W 76/27* | (2018.01) | |
| *H04L 1/00* | (2006.01) | |
| *H04W 4/06* | (2009.01) | |
| *H04W 24/08* | (2009.01) | |
| *H04B 17/318* | (2015.01) | |
| *H04W 24/10* | (2009.01) | |

(52) U.S. Cl.
CPC ....... *H04W 24/08* (2013.01); *H04W 28/0231* (2013.01); *H04W 28/0273* (2013.01); *H04W 28/0284* (2013.01); *H04W 36/30* (2013.01); *H04W 72/005* (2013.01); *H04W 76/27* (2018.02); *H04W 88/06* (2013.01); *H04B 17/318* (2015.01); *H04W 24/10* (2013.01)

(58) Field of Classification Search
CPC ......... H04W 28/0273; H04W 28/0284; H04W 36/00; H04W 36/0007; H04W 36/30; H04W 72/00; H04W 72/005; H04W 76/27; H04W 88/06; H04W 36/0058; H04W 36/00837; H04W 16/08; H04W 28/0226; H04W 28/0236; H04W 28/0242; H04W 28/0289; H04W 36/0005; H04W 36/0009; H04W 36/0079; H04W 36/0083; H04W 36/22; H04W 36/24; H04W 36/305; H04W 72/02; H04W 72/04; H04W 72/1226; H04W 76/40; H04L 1/0026; H04L 43/00; H04B 17/318; H04B 17/31
See application file for complete search history.

(56) References Cited

U.S. PATENT DOCUMENTS

| | | | |
|---|---|---|---|
| 8,554,211 B2 | 10/2013 | Angelow et al. | |
| 8,588,171 B2 | 11/2013 | Fukuoka et al. | |
| 8,644,261 B1 | 2/2014 | Vargantwar et al. | |
| 9,001,737 B2 | 4/2015 | Amerga et al. | |
| 9,030,988 B2 * | 5/2015 | Sayeed ................... | H04W 4/06 370/312 |
| 9,191,922 B2 | 11/2015 | Anchan et al. | |
| 9,338,020 B2 * | 5/2016 | Sridhar ............... | H04W 72/005 |
| 9,380,526 B2 * | 6/2016 | Koivisto ............... | H04L 1/0009 |
| 9,439,171 B2 * | 9/2016 | Phan ................... | H04W 72/005 |
| 9,648,584 B2 | 5/2017 | Hiben et al. | |
| 9,723,523 B2 * | 8/2017 | Purnadi ............. | H04W 36/0055 |
| 9,763,151 B2 * | 9/2017 | Kim ........................ | H04L 5/00 |
| 9,820,259 B2 * | 11/2017 | Wang .................... | H04W 72/005 |
| 9,826,502 B2 * | 11/2017 | Cherian .............. | H04W 72/005 |
| 9,860,935 B2 * | 1/2018 | Teyeb ..................... | H04L 12/18 |
| 10,070,413 B2 * | 9/2018 | Phan ................... | H04W 72/005 |
| 10,075,883 B2 * | 9/2018 | Zhao ..................... | H04L 12/189 |
| 10,084,581 B2 | 9/2018 | Sun et al. | |
| 10,219,245 B2 * | 2/2019 | Prasad .................... | H04W 4/06 |
| 10,231,174 B2 * | 3/2019 | Byun ..................... | H04W 72/00 |
| 10,277,416 B2 * | 4/2019 | Zhu ........................ | H04W 4/06 |
| 10,292,020 B2 * | 5/2019 | Frost ................... | H04W 28/0289 |
| 10,299,182 B2 * | 5/2019 | Nagasaka ............. | H04W 36/14 |
| 10,419,893 B2 * | 9/2019 | Åkesson ............. | H04W 72/005 |
| 10,492,239 B2 * | 11/2019 | Fujishiro ................ | H04W 28/04 |
| 10,530,595 B2 * | 1/2020 | Zhu ........................ | H04W 36/26 |
| 10,728,714 B2 * | 7/2020 | Al-Daher .............. | H04W 72/085 |
| 10,771,298 B2 * | 9/2020 | Al-Daher .............. | H04L 5/0037 |
| 2002/0067909 A1 | 6/2002 | Iivonen | |
| 2002/0112244 A1 | 8/2002 | Liou et al. | |
| 2004/0106412 A1 | 6/2004 | Laroia et al. | |
| 2007/0135170 A1 | 6/2007 | Khan et al. | |
| 2007/0168523 A1 * | 7/2007 | Jiang ................... | H04L 65/1101 709/228 |
| 2008/0002691 A1 | 1/2008 | Qi et al. | |
| 2008/0132263 A1 | 6/2008 | Yu et al. | |
| 2008/0267317 A1 | 10/2008 | Malladi et al. | |
| 2009/0175183 A1 * | 7/2009 | Mochizuki ............ | H04W 36/18 370/252 |
| 2009/0274453 A1 | 11/2009 | Viswambharan et al. | |
| 2010/0035627 A1 | 2/2010 | Hou et al. | |
| 2010/0077441 A1 | 3/2010 | Thomas et al. | |
| 2010/0216454 A1 | 8/2010 | Ishida et al. | |
| 2011/0032832 A1 | 2/2011 | Jalali et al. | |
| 2011/0305184 A1 | 12/2011 | Hsu et al. | |
| 2012/0269075 A1 * | 10/2012 | Fernandes .......... | H04N 21/6112 370/252 |
| 2013/0028118 A1 * | 1/2013 | Cherian .............. | H04W 72/005 370/252 |
| 2013/0044614 A1 | 2/2013 | Aguirre et al. | |
| 2013/0170424 A1 | 7/2013 | Anchan et al. | |
| 2013/0170818 A1 | 7/2013 | Klappert et al. | |
| 2013/0229974 A1 | 9/2013 | Xu et al. | |
| 2013/0251329 A1 | 9/2013 | McCoy et al. | |
| 2013/0258934 A1 | 10/2013 | Amerga et al. | |
| 2013/0258935 A1 | 10/2013 | Zhang et al. | |
| 2013/0294321 A1 | 11/2013 | Wang et al. | |
| 2013/0336173 A1 | 12/2013 | Mandil et al. | |
| 2014/0095668 A1 | 4/2014 | Oyman et al. | |
| 2014/0156800 A1 | 6/2014 | Falvo | |
| 2014/0169255 A1 | 6/2014 | Zhang et al. | |
| 2014/0192697 A1 | 7/2014 | Anchan et al. | |
| 2014/0286222 A1 | 9/2014 | Yu et al. | |
| 2014/0321826 A1 | 10/2014 | Stelmack et al. | |
| 2015/0009821 A1 | 1/2015 | Sridhar et al. | |
| 2015/0117323 A1 | 4/2015 | Hiben et al. | |
| 2015/0163379 A1 | 6/2015 | Herzog et al. | |
| 2016/0081070 A1 | 3/2016 | Li et al. | |
| 2016/0105894 A1 * | 4/2016 | Lu ....................... | H04W 72/005 370/329 |
| 2016/0211980 A1 | 7/2016 | Zhu et al. | |
| 2016/0234570 A1 | 8/2016 | Van et al. | |
| 2016/0269189 A1 * | 9/2016 | Xu ........................ | H04L 12/189 |
| 2018/0263074 A1 | 9/2018 | Wang et al. | |
| 2019/0268197 A1 | 8/2019 | Al-Daher et al. | |

FOREIGN PATENT DOCUMENTS

| | | |
|---|---|---|
| CN | 102300168 A | 12/2011 |
| CN | 102379100 A | 3/2012 |
| CN | 102405665 A | 4/2012 |
| CN | 103535093 A | 1/2014 |
| CN | 103546477 A | 1/2014 |
| CN | 103797873 A | 5/2014 |
| CN | 103974198 A | 8/2014 |
| CN | 104105070 A | 10/2014 |
| CN | 104303545 A | 1/2015 |
| CN | 104540043 A | 4/2015 |
| CN | 104756587 A | 7/2015 |

(56) References Cited

FOREIGN PATENT DOCUMENTS

| | | | | |
|---|---|---|---|---|
| CN | 104954994 | A | 9/2015 | |
| CN | 105103575 | A | 11/2015 | |
| CN | 105684473 | A | 6/2016 | |
| EP | 1650989 | A1 | 4/2006 | |
| EP | 2086173 | A1 | 8/2009 | |
| EP | 2244502 | A1 | 10/2010 | |
| EP | 2244502 | B1 | 6/2011 | |
| EP | 2606662 | A1 | 6/2013 | |
| EP | 2775730 | A1 | 9/2014 | |
| EP | 2925003 | A1 | 9/2015 | |
| EP | 3125582 | A1 | 2/2017 | |
| GB | 2483125 | A | 2/2012 | |
| JP | 2013070841 | A | 4/2013 | |
| WO | WO-2009094744 | A1 | 8/2009 | |
| WO | WO-2012137078 | A2 | 10/2012 | |
| WO | WO-2012142428 | A1 | 10/2012 | |
| WO | WO-2013141874 | A1 | 9/2013 | |
| WO | WO-2014004787 | A1 * | 1/2014 | ............ H04W 4/06 |
| WO | WO-2014146617 | A1 | 9/2014 | |
| WO | WO-2015000912 | A1 | 1/2015 | |
| WO | WO-2015039888 | A1 | 3/2015 | |
| WO | WO-2015061983 | A1 | 5/2015 | |
| WO | WO-2015062443 | A1 | 5/2015 | |
| WO | WO-2015069407 | A1 | 5/2015 | |
| WO | WO-2015071461 | A1 | 5/2015 | |
| WO | WO-2015080407 | A1 | 6/2015 | |
| WO | WO-2015103947 | A1 | 7/2015 | |
| WO | WO-2015166087 | A2 | 11/2015 | |
| WO | WO-2016029938 | A1 | 3/2016 | |
| WO | WO-2017089183 | A1 | 6/2017 | |
| WO | WO-2017167648 | A1 | 10/2017 | |
| WO | WO-2017167835 | A1 | 10/2017 | |
| WO | WO-2017167838 | A1 | 10/2017 | |
| WO | WO-2018001897 | A1 | 1/2018 | |
| WO | WO-2018024395 | A1 | 2/2018 | |

OTHER PUBLICATIONS

3GPP TS 23.246 V9.5.0, release 9 (Jun. 2010), "LTE; Multimedia Broadcast/Multicast Service (MBMS), Architecture and Functional Description," Universal Mobile Telecommunications System (UMTS), Technical Specification, ETSI TS 123 246, Jun. 2010, 67 pages.
3GPP TS 23.468 V15.0.0 (Release 15), "LTE; Group Communication System Enablers for LTE (GCSE_LTE) Stage 2," Technical Specification Group Services and System Aspect, 3rd Generation Partnership Project, ETSI TS 123 468 V15.0.0, Jul. 2018, 32 pages.
Alcatel-Lucent, "Analysis of Service Continuity Requirement for Group Communication," 3GPP Draft; R2-140757, 3GPP TSG RAN WG2 Meeting #85, and Agenda Item: 7.6.3, Prague, Czech Republic, Feb. 10-14, 2014, 3 pages.
CATT, "Considerations on Service Continuity for eMBMS," 3GPP Draft; R2-134045, 3GPP TSG RAN WG2 Meeting #84, agenda Item: 7.6.3, San Francisco, USA, Nov. 2013, 4 pages.
CATT, "Evaluation on Service Continuity for eMBMS," 3GPP Draft; R2-140138, 3rd Generation Partnership Project (3GPP), Mobile Competence Centre ; 650, Route Des Lucioles ; F-06921 Sophia-Antipolis Cedex; France, vol. RAN WG2, Feb. 9, 2014, retrieved from URL: http://www.3gpp.org/ftp/Meetings_3GPP_SYNC/RAN2/Docs/, 3 pages.
Catt, "Methods for Service Continuity Improvement due to UE Mobility," 3GPP Draft; R2-140141, 3GPP TSG RAN WG2 Meeting #85, Prague, Czech Republic, Feb. 10-14, 2014, 3 pages.
Combined search and Examination Report for Great Britain Application No. 1605519.6, dated Sep. 28, 2016, 4 pages.
Combined Search and Examination Report for Great Britain Application No. 1605525.3, dated Oct. 3, 2016, 8 pages.
Combined Search and Examination Report for Great Britain Application No. 1609547.3, dated Nov. 30, 2016, 6 pages.
Combined Search and Examination Report for Great Britain Application No. 1611277.3, dated Dec. 6, 2016, 8 pages.
Combined Search and Examination Report for Great Britain Application No. 1613477.7, dated Dec. 19, 2016, 5 pages.
Ericsson, "MBMS Service Continuity Aspects for Group Communication," 3GPP Draft; R2-140821, 3rd Generation Partnership Project (3GPP), Mobile Competence Centre; 650, Route Des Lucioles; F-06921 Sophia-Antipolis Cedex, France, vol. RAN WG2, Feb. 9, 2014, retrieved from URL: http://www.3gpp.org/ftp/Meetings_3GPP_SYNC/RAN2/Docs/, 11 pages.
ETSI TS 103 286-2 VI.1.1 (May 2015), "Technical Specification; Digital Video Broadcasting (DVB), Companion Screens and Streams, Part 2: Content Identification and Media Synchronization," 650 Route des Lucioles F-06921 Sophia Antipolis Cedex, France, http://www.etsi.org/deliver/etsi_tsll03200103299/10328602/01.01.01_60/ts10328602v010101p.p.df, retrieved on Apr. 24, 2018, 166 pages.
European Search Report for Application No. 16163451.4, dated Sep. 28, 2016, 8 pages.
European Search Report for Application No. 16163458.9, dated Sep. 20, 2016, 11 pages.
European Search Report for Application No. 16172341.6, dated Jun. 14, 2017, 10 pages.
European Search Report for Application No. 16182850.4, dated Jan. 17, 2017, 7 pages.
European Search Report for Application No. EP15196875.7, dated May 19, 2016, 6 pages.
"HbbTV 2.0.2 Specification," HbbTV Association, Retrieved on Apr. 24, 2018 from https://www.hbbtv.org/wpcontent/uploads/2018/02/HbbTVv202 specification_2018 02_16.pdf, Feb. 16, 2018, 313 pages.
Huawei, HiSilicon "Service Continuity for Group Communication Over eMBMS," 3GPP Draft; R2-140261, 3GPP TSG-RAN WG2 #85, Prague, Czech Republic, Feb. 10-14, 2014, 7 pages.
International Preliminary Report on Patentability for Application No. PCT/EP2017/057026, dated Oct. 11, 2018, 10 pages.
International Preliminary Report on Patentability for Application No. PCT/EP2017/057470, dated Oct. 11, 2018, 10 pages.
International Preliminary Report on Patentability for Application No. PCT/EP2017/057474, dated Oct. 11, 2018, 8 pages.
International Preliminary Report on Patentability for corresponding PCT Application No. PCT/EP2017/065543, dated Aug. 17, 2018, 29 pages.
International Search Report and Written Opinion for Application No. PCT/EP2016/077747, dated Jan. 24, 2017, 12 pages.
International Search Report and Written Opinion for Application No. PCT/EP2017/057026, dated Apr. 18, 2017, 14 pages.
International Search Report and Written Opinion for Application No. PCT/EP2017/057470, dated Jun. 19, 2017, 12 pages.
International Search Report and Written Opinion for Application No. PCT/EP2017/057474, dated Jun. 13, 2017, 14 pages.
International Search Report and Written Opinion for Application No. PCT/EP2017/064946, dated Jul. 10, 2017, 13 pages.
International Search Report and Written Opinion for Application No. PCT/EP2017/065543, dated Jul. 24, 2017, 17 pages.
LG Electronics Inc, "Service continuity for group communication," 3GPP Draft; R2-140766, 3GPP TSG RAN WG2 #85, Agenda Item: 7.6.3, Prague, Czech Republic, Feb. 10-14, 2014, 2 pages.
LTE, "Multicast Broadcast Single Frequency Network (MBSFN) Handbook," ShareTechnote, retrieved from http://www.sharetechnote.com/html/Handbook_LTE_MBSFN.html on Sep. 14, 2018, 13 pages.
NEC Corporation, "Enabling Service Continuity for Group Communication," 3GPP Draft; R2-140586_GCSE_SC, 3GPP TSG RAN2 Meeting #85, and Agenda Item: 7.6.3, Prague, Czech Republic, Feb. 10-14, 2014, 7 pages.
Prasad A., et al., "Enabling Group Communications for Public Safety in LTE-Advanced Networks," Journal of Network and Computer Applications, vol. 62, 2016, pp. 41-52.
Qualcomm Incorporated, "GCSE Service Continuity During Unicast and MBMS Switching," 3GPP Draft S2-133446 UC BC Switching, SA WG2 Meeting #99, Agenda Item: 6.5, Xiamen, China, Sep. 2013, 7 pages.
Qualcomm "LTE Evolved Multimedia Broadcast Multicast Service (eMBMS) Technology Overview," Qualcomm Research, San Diego, Nov. 2012, 18 pages.

(56) References Cited

OTHER PUBLICATIONS

Small Cell Forum, "X2 Interoperability," Release Four, Document 059.04.01, www.smallcellforum.org, Jun. 2014, 29 pages.
European Search Report for Application No. 16176922.9, dated Nov. 23, 2016, 11 pages.
International Preliminary Report on Patentability for Application No. PCT/EP2016/077747, dated Jan. 18, 2018, 10 pages.
DVB Organization: "ts_102796v010301p_draft_23-non-etsi-branding.pdf", DVB, Digital Video Broadcasting, C/O EBU—17A Ancienne Route—CH-1218 Grand Saconnex, Geneva—Switzerland, Oct. 9, 2014 (Oct. 9, 2014), XP017845818.
ETSI TS 123.246 "Universal Mobile Telecommunication System (UMTS); LTE; Multimedia Broadcast/Multicast Service (MBMS); Architecture and Functional Description (Release 9)," V9.5.0 (Jun. 2010); the 3rd Generation Partnership Project, pp. 1-67.
Examination Report for Great Britain Application No. 1605519.6 dated Sep. 27, 2018, 4 pages.
Written Opinion of the International Preliminary Examining Authority for Application PCT/EP2017/065543, dated Jun. 1, 2018, 11 pages.
Wu, et al., "CloudMo V: Cloud-based Mobile Social TV," Retrieved on Apr. 24, 2018 from http://i.cs.hku.hk/~cwu/papers/ywutmm12.pdf, 2012, 12 pages.
Zte, "Service Continuity for Group Communication due to UE Mobility," 3GPP Draft; R2-140101, 3GPP TSG-RAN WG2#85, and Agenda Item: 7.6.3, Prague, Czech Republic, Feb. 10-14, 2014, 3 pages.
U.S. Appl. No. 16/085,257, filed Sep. 14, 2018, Inventor(s): MacKenzie et al.
U.S. Appl. No. 16/085,382, filed Sep. 14, 2018, Inventor(s): Al-Daher et al.
U.S. Appl. No. 16/310,948, filed Dec. 18, 2018, Inventor(s): MacKenzie et al.
Application and Filing Receipt for U.S. Appl. No. 15/774,934, filed May 9, 2018, Inventor(s): Rennison et al.
Great Britain Search Report, Application No. GB1611277,3, dated Jun. 26, 2019, 4 pages.
ShareTechnote, *Multi Cell-Measurement in LTE*, dated Nov. 28, 2019, 16 pages, available at www.sharetechnote.com.
Great Britain Search Report, Application No. GB1609547.3, dated Aug. 20, 2019, 2 pages.
Application and Filing Receipt for U.S. Appl. No. 16/318,533, filed Jan. 17, 2019, inventors Al-Daher et al., as available on PAIR at http://www.uspto.gov.
Application as filed for U.S. Appl. No. 16/318,553, filed Jan. 17, 2019, 9 pages, Inventor(s): Al-Daher et al.
Application as filed for U.S. Appl. No. 16/310,948, filed Dec. 18, 2018, Inventor(s):Mackenzie., et al., 282 pages.
Combined Search and Examination Report under Section 17 and 18(3) for GB Application No. 1613477.7, dated Dec. 19, 2016, 5 pages.
Examination Report for GB Application No. GB1611277.3, dated Jun. 26, 2019, 4 pages.
Examination Report for Great Britain Application No. 1521000.8 dated Nov. 27, 2017, 12 pages.
Examination Report under Section 18(3) for Great Britain Application No. 1605519.6 dated Jul. 5, 2019, 4 pages.
Examination Report under Section 18(3) for Great Britain Application No. 1609547.3, dated Aug. 20, 2019, 2 pages.
First Office Action for Chinese Application No. 201780040711.3, dated Aug. 4, 2020, 12 pages.
International Preliminary Report on Patentability for Application No. PCT/EP2017/064946, dated Feb. 14, 2019, 7 pages.
Office Action for Chinese Application No. 201780015375.7, dated Sep. 29, 2020, 17 pages.
Prasad A et al., "Enhancements for Enabling Point-to-Multipoint Communication Using Unlicensed Spectrum," May 1, 2018, 7 pages.
Prasad A., et al., "Enhancements for Enabling Point-to-Multipoint Communication Using Unlicensed Spectrum," Retrieved from https://www.reserachgate.net/publication/324783210, 2018, 7 pages.
Sharetechnote, "Multi Cell—Measurement in LTE," Nov. 28, 2019, 16 pages.
Communication Pursuant to Article 94(3) EPC for Application No. 17713043.2, dated Feb. 11, 2021, 6 pages.
Office Action for Chinese Application No. 201780015375.7, dated Jun. 3, 2021, 3 pages.
Office Action for Chinese Application No. 201780048245.3, dated Nov. 30, 2020, 9 pages.
Zhang X., "LTE Optimization and Principle and Method," Jan. 2018, 1 page.
Office Action for Chinese Application No. 201780015137.6, dated Jan. 29, 2022, 18 pages.

\* cited by examiner

MOBILE COMMUNICATIONS NETWORK

CROSS-REFERENCE TO RELATED APPLICATION

The present application is a National Phase entry of PCT Application No. PCT/EP2017/057474, filed Mar. 29, 2017, which claims priority from EP Patent Application No. 16163458.9, filed Mar. 31, 2016, and EP Patent Application No. 16172341.6, filed May 31, 2016 each of which is hereby fully incorporated herein by reference.

TECHNICAL FIELD

The present disclosure relates to mobile communication networks and to a base station for a mobile communications network.

BACKGROUND

Multimedia content, such as video playback, live streaming, online interactive gaming, file delivery and mobile TV, is seen as the key driver for data traffic demand on wireless cellular networks. Multimedia content to a large number of users can be distributed by unicast, broadcast and multicast. In the following, the term "multicast" is used to include "broadcast" and vice versa. Unicast is a dedicated bidirectional point-to-point link for transmission between the base station and one user mobile device. Evolved Multimedia Broadcast Multicast Service (eMBMS) is an LTE technique enabling a specific broadcast bearer to deliver data content to multiple users over shared downlink resources, which is more efficient than dedicating a unicast bearer for each user. Multicast-broadcast single-frequency network (MBSFN) further improves spectral efficiency by dynamically forming single-frequency networks whereby a mobile terminal (in LTE, the UE) can seamlessly receive the same content over eMBMS from multiple base stations (in LTE, the eNodeB) within a MBSFN area. A single-frequency network comprises groups of adjacent eMBMS base stations at which the same signal is synchronized and broadcast simultaneously on the same MBSFN sub-carrier frequencies and time-slots. The combination of eMBMS transmission from multiple base stations in a MBSFN service area provides a degree of transmission robustness in the form of spatial transmit diversity and effectively eliminates internal cell edges.

A problem exists in handling the transfer of a mobile terminal between different MBSFN areas and between MBSFN and reserved unicast cells. A similar problem exists in handling the transfer of a mobile terminal between eMBMS cells. Seamless mobility of the mobile terminals across an LTE network with different MBSFNs is not supported in 3GPP, so that service interruption may result, i.e. due to delays at the cell-edges while the mobile terminal acquires information about the targeted area or cell. Service interruption may also result when a mobile terminal moves from a MBSFN providing an eMBMS broadcast service to a MBSFN where the service in question is only available by unicast.

The problem may be addressed by switching the mobile terminal to unicast before the transition to another cell/sector. However, unicast transmission can place a higher load on resources than broadcast or multicast/broadcast transmission.

SUMMARY

Embodiments of the disclosure provide the ability to moderate the rate at which mobile terminals switch to unicast in order to control the load placed on resources in the mobile network.

The present disclosure accordingly provides, in a first aspect, a method of operating a mobile communications network comprising a plurality of base stations, in which each base station comprises at least one transceiver, in which a first transceiver is comprised in a first base station, in which the method comprises, operating the first transceiver to: serve a mobile terminal over multicast/broadcast across a network; receive information from the mobile terminal being served by the transceiver, in which the information derives from signal quality of a multicast/broadcast serving signal received at the mobile terminal from the first transceiver; and provide to the mobile terminal first instructions based on a first comparison of the quality of the multicast/broadcast serving signal received at the mobile terminal in which the comparison is based on a first threshold; in which the first instructions instruct the mobile terminal to switch to unicast; in which the method further comprises varying the first threshold in dependence on a measure of loading of the network.

In this way the disclosure provides for regulation of the rate of transfer of the mobile terminals from multicast/broadcast to unicast so as to control the network load on resources (since unicast places a higher load on resources).

According to an embodiment, the present disclosure provides: receiving further information from the mobile terminal being served by the first transceiver, in which the further information derives from the signal quality of a unicast serving signal received at the mobile terminal from the first transceiver; providing to the mobile terminal second instructions based on a second comparison of the quality of the unicast serving signal received at the mobile terminal; in which the comparison is based on the a second threshold; in which the second instructions instruct the mobile terminal to monitor signal quality of signals received from a second transceiver.

According to an embodiment, the present disclosure provides: varying the second threshold in dependence on a measure of loading of the network.

According to an embodiment, the present disclosure provides: receiving further information from the mobile terminal being served by the first transceiver, in which the further information derives from the signal quality of a unicast serving signal received at the mobile terminal from the first transceiver and the signal quality of a second signal received at the mobile terminal from a second transceiver; providing to the mobile terminal third instructions based on a third comparison of the quality of the unicast serving signal received at the mobile terminal and the quality of the second signal received at the mobile terminal; in which the second instructions instruct the mobile terminal to transition to being served by the second transceiver.

According to an embodiment, the present disclosure provides: upon detecting an increase in the loading, varying the first threshold so as to reduce the rate at which mobile terminals served by the first base station are switched to unicast.

According to an embodiment, the present disclosure provides: upon detecting a decrease in the loading, varying the first threshold so as to increase the rate at which mobile terminals served by the first base station are switched to unicast.

According to an embodiment, the present disclosure provides: varying at least one of the first threshold and the second threshold based on detected conditions on a communications channels between the base station and the mobile terminal.

According to an embodiment, the network loading comprises at least one of: the radio resource usage load at the first transceiver and traffic levels on radio frequencies between the first transceiver and at least one mobile terminal.

According to an embodiment, the mobile terminal is in motion relative to the transceivers, in which the distance between the mobile terminal and the second transceiver at the point of providing to the mobile terminal the first instruction is greater than the distance between the mobile terminal and the second transceiver at the point of providing to the mobile terminal the second instruction.

According to an embodiment, the first and second transceivers are comprised in a single base station.

According to an embodiment, providing the first instructions to the mobile terminal is triggered when the quality of the multicast/broadcast serving signal received at the mobile terminal changes from being equal to or less than the first threshold to being greater than the first threshold.

According to an embodiment, providing the first instructions to the mobile terminal is triggered when the quality of the multicast/broadcast serving signal received at the mobile terminal changes from being greater than the first threshold to being equal to or less than the first threshold.

The present disclosure also provides, in a second aspect, a base station for a mobile communications network, in which the base station comprises: a plurality of transmitters, in which each transmitter is configured to transmit radio signals to a plurality of mobile terminals; a plurality of receivers, in which each receiver is configured to receive radio signals from a plurality of mobile terminals; and a processor configured to: serve a mobile terminal over multicast/broadcast across a radio link; receive information from the mobile terminal being served by the transmitter, in which the information derives from signal quality of a multicast/broadcast serving signal received at the mobile terminal from the transmitter; and provide to the mobile terminal first instructions based on a first comparison of the quality of the multicast/broadcast serving signal received at the mobile terminal in which the comparison is based on a first threshold; in which the first instructions instruct the mobile terminal to switch to unicast; in which the processor is further configured to vary the first threshold in dependence on a measure of loading of the network.

BRIEF DESCRIPTION OF THE DRAWINGS

In order that the present disclosure may be better understood, embodiments thereof will now be described, by way of example only, with reference to the accompanying drawings in which.

DETAILED DESCRIPTION

The disclosure provides a method to achieve, in a serving cell/sector, switching a mobile terminal to unicast.

A switch to unicast is triggered by a first comparison comparing the quality of the signal received at the mobile terminal from the current serving cell/sector with a first threshold value. That is, the switch to unicast is triggered when the quality of the signal received at the mobile terminal from the current serving cell/sector meets or passes the first threshold value. The first threshold value is varied in dependence on a measure of network loading. According to the disclosure, the rate at which mobile terminals switch to unicast may be controlled through varying the first threshold value.

According to an embodiment of the disclosure, monitoring and comparing of signals from multiple cells/sectors, with a view to selecting a different cell/sector, is initiated by a second comparison comparing the quality of the, now unicast, signal received at the mobile terminal from the current serving cell/sector with a second threshold. That is, the monitoring and comparing is initiated when the quality of the signal received at the mobile terminal from the current serving cell/sector meets or passes the second threshold value.

According to a further embodiment of the disclosure, a transition to a different cell/sector is subsequently triggered following the above monitoring and comparing of signals from multiple cells/sectors. According to this, further, embodiment, the transition is triggered by a third comparison comparing the quality of the, now unicast, signal received at the mobile terminal from the current serving cell/sector with one or more signals received at the mobile terminal from one or more neighboring cell. That is the mobile terminal transitions from the current cell/sector to a target cell/sector when the difference between the current cell/sector signal quality and the target cell signal quality meets a set criterion.

Variable Thresholds

The rate of transfer of the mobile terminals from multicast/broadcast to unicast is regulated so as to control the network load (since unicast places a higher load on the network). According to embodiments of the disclosure, the first threshold is varied according to network loading.

Network loading may be defined as one or a combination of: radio resource load in the cell or sector, backhaul network load and processing load on the base station. The radio resource load may comprise at least one of: the radio resource usage load at the base station and traffic levels on communications channels between the base station and the plurality of the mobile terminals. The load may be calculated at the base station, for example by monitoring physical resource block (PRB) usage (i.e. the number of PRBs used averaged over time divided by the total number of PRB available to the cell and reported as a percentage), hardware (HW) load indicator or transport network load (TNL) indicator. Backhaul network load may simply be measured in terms of data rate or proportion of available resources that are being used. It could be that the capacity of the radio network or the backhaul varies (e.g. due to contention, environmental conditions or equipment failure), in which case, the threshold may be varied to compensate. Processing load may be measured in terms of the proportion of available base station processing resources that are being used. Processing resources may be scalable (e.g. by booting-up additional cores or adding memory, when required). In general, the processing required for accommodating one additional unicast stream will be higher than adding an additional user to an existing multicast/broadcast stream. According to an embodiment, the base station reports calculated load to the mobile terminal.

A value for signal quality may be derived from measuring signal power of LTE reference signals using the reference signal received power (RSRP) parameter. To calculate RSRP, the total estimated power of multiple reference signal subcarriers of a LTE signal is averaged. According to an embodiment of the disclosure, the first and second criteria relate to measurements at the mobile terminal of RSRP values.

The first criterion may depend on the channel conditions (i.e. communications channels between the base station and the mobile terminal). Where there is a lot of multi-path or shadowing, the measured signal quality may be prone to fading and recovering and may change quickly with a small displacement of the mobile terminal. In which case, the threshold may be selected so that switching to unicast occurs earlier.

Figure 1:
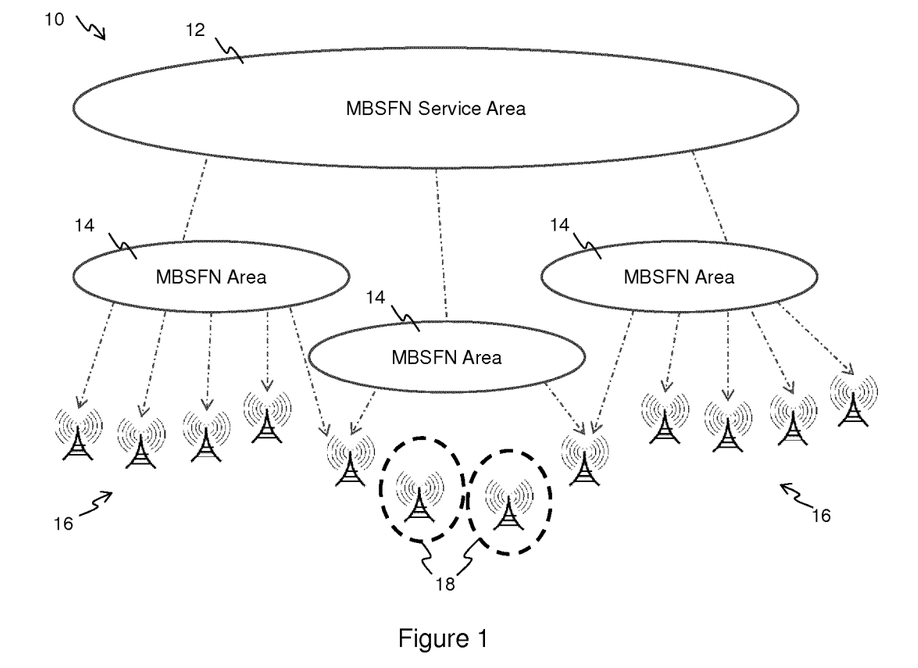
FIGS. 1 and 2 show a conventional 3GPP mobile communications network.

In Evolved Universal Terrestrial Radio Access Network (E-UTRAN), eMBMS services may be provisioned by defining MBSFN areas within a geographical area designated for broadcast (or multicast) services. A broadcast service area could be a single cell or multiple cells. A multi-cell MBSFN area defines a set of base stations participating in MBSFN service modes. FIG. 1 illustrates a MBSFN network structure. Within MBSFN network 10, an operator operates a MBSFN service area 12 for deploying a broadcast (or multicast) service. Within that service area there may be a plurality of MBSFN areas 14. Each MBSFN area 14 consists of a number of base stations 16, each serving a different cell (not shown). The base stations 16 in a particular MBSFN area 14 are capable of synchronizing together to provide the MBSFN service across multiple cells in the MBSFN area. Some of the base stations 16 within the MBSFN areas 14, serve reserved cells 18. A MBSFN area reserved cell is a cell within a MBSFN area that does not contribute to the MBSFN transmission and may be used for other services, e.g. unicast. Within a MBSFN area, eMBMS can be provided over a single frequency layer dedicated to MBSFN transmission or over a single frequency layer that is shared between MBSFN transmission and unicast services. Where Radio Resource Control (RRC) is used, reception of eMBMS services is available for the mobile terminals in RRC_Connected or RRC_Idle states.

LTE supports overlap between MBSFN service areas, for example, smaller MBSFN areas can overlap larger ones for regional and national coverage. In 3GPP LTE or 4G, one base station can belong to up to eight MBSFN areas. All base stations transmitting MBSFN in a single area are required to be synchronized, so that the same multimedia content is transmitted from all the base stations with a mutual offset of no more than a few micro-seconds.

Figure 2:
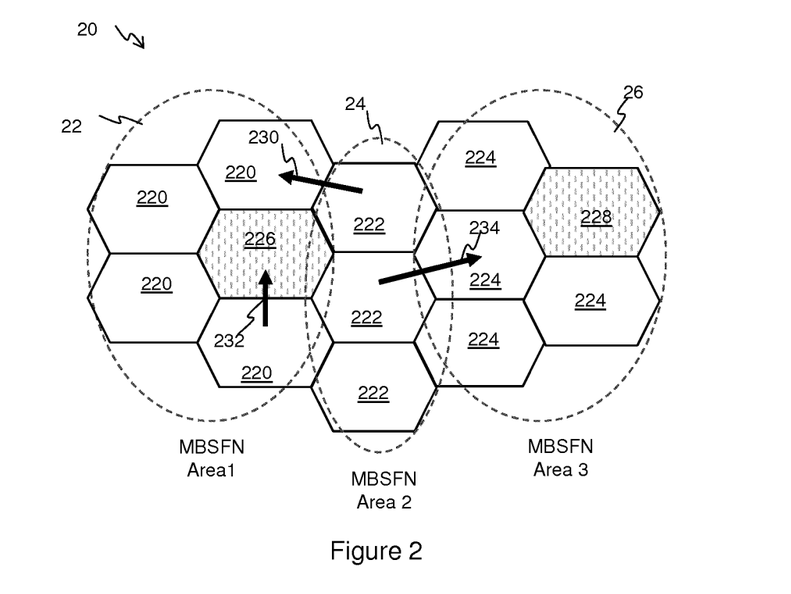

One of the key features of the LTE network is mobility provision. Supporting seamless user mobility across the network requires service continuity for eMBMS users and plays an important role in maintaining service quality and customer satisfaction. There are a number of scenarios where it would be desirable for a LTE mobile terminal to be able to move from one base station to another whilst receiving MBSFN service, for example when a mobile terminal is moving into a MBSFN area reserved cell whilst receiving an eMBMS service and when moving from one MBSFN cell to another cell not within the same MBSFN area. FIG. 2 shows MBSFN service area 20 comprising exemplary MBSFN areas 22, 24 and 26—each MBSFN area comprising a plurality of cells, each cell defined by a different base station (not shown). MBSFN area 22 comprises a plurality of multicast/broadcast cells 220 and one MBSFN area reserve (unicast) cell 226. MBSFN area 24 comprises a plurality of multicast/broadcast cells 222 but no MBSFN area reserve (unicast) cell. MBSFN area 26 comprises a plurality of multicast/broadcast cells 224 and one MBSFN area reserve (unicast) cell 228. Exemplary transitions between the cells of MBSFN service area 20 are shown, as follows. Transitions 230 and 234 represent a mobile terminal passing from one multicast/broadcast cell to another multicast/broadcast cell in a different MBSFN area. Transition 232 represents a mobile terminal passing from a multicast/broadcast cell to an MBSFN area reserved cell in the same MBSFN area.

Figure 3A:
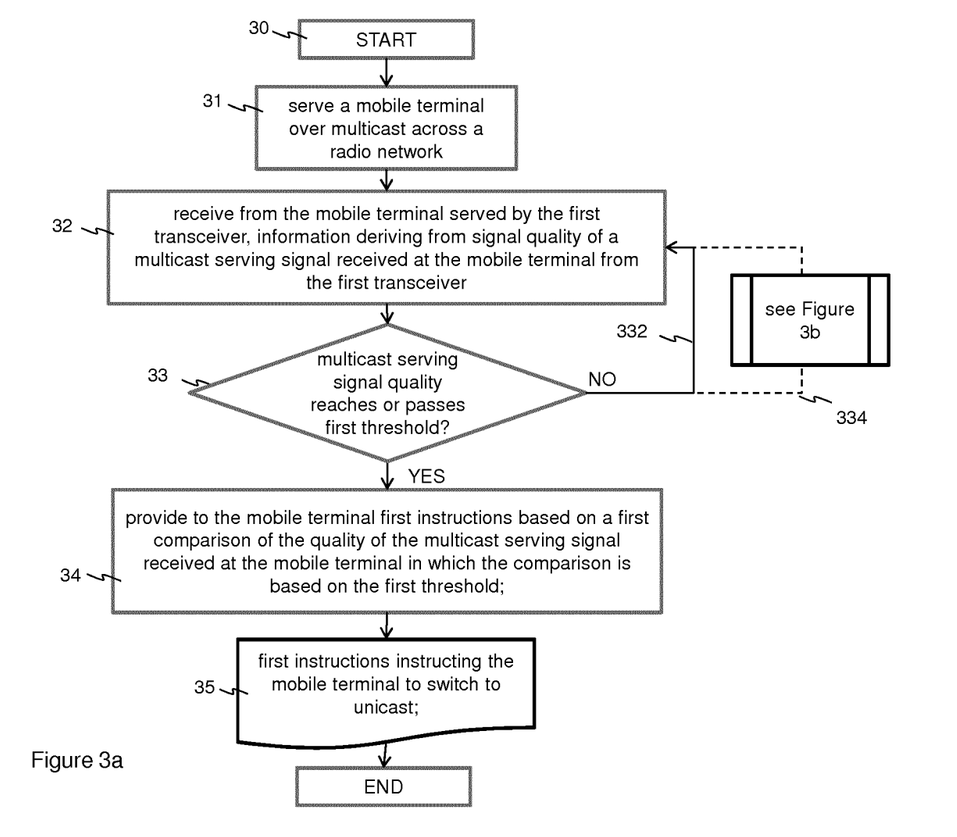
FIGS. 3a and 3b show sequences of events according to embodiments of the disclosure.
Figure 3B:
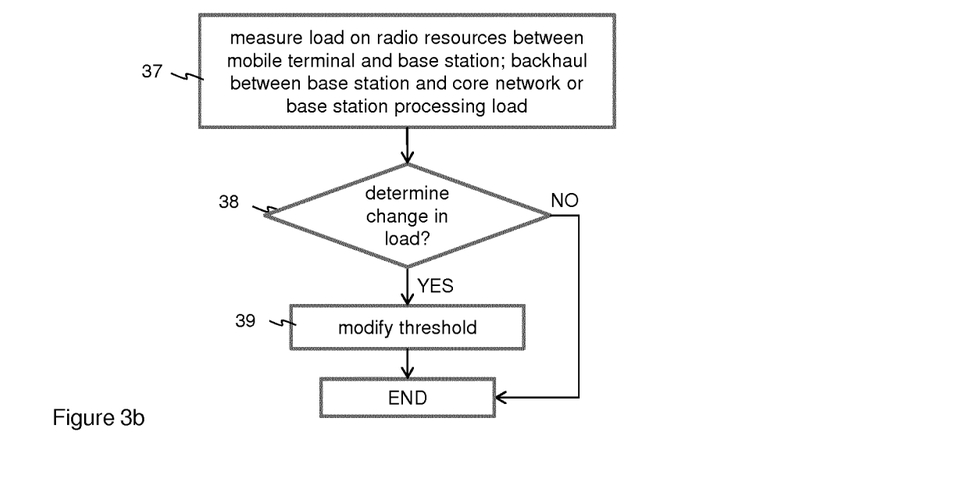

FIG. 3a shows a sequence of events according to an embodiment of the disclosure. The sequence of FIG. 3a relates to a mobile communications network comprising a plurality of base stations, in which each base station comprises at least one transceiver comprising a transmitter and a receiver, in which a first transceiver is comprised in a first base station. At 31, a mobile terminal is served over multicast/broadcast across a mobile network by a base station by use of a first transceiver. At 32, the base station receives from the mobile terminal served by the first transceiver, information deriving from signal quality of a multicast/broadcast serving signal received at the mobile terminal from the first transceiver. The base station can use this information to assess when to switch communication with the mobile terminal from multicast/broadcast to unicast. At decision element 33 the quality of the multicast/broadcast signal is compared to the first threshold value. If the quality of the multicast/broadcast signal is determined to have reached or passed the first threshold value, then processing passes on to process element 34. Otherwise, as shown by path 332, processing returns to process element 32. At 34, first instructions (based on the first comparison of process element 33) are provided to the mobile terminal. The first instructions 35 instruct the mobile terminal to switch to unicast. FIG. 3b shows variation of the first threshold in dependence on a measure of loading of the network. At 37 in FIG. 3b, the load on resources between mobile terminal and network is measured, as described, above. At 38, the measured load is checked to determine if a change has occurred (i.e. since the last measurement was taken). According to an embodiment of the disclosure, changes less than a minimum degree may be disregarded or hysteresis may be applied in order to avoid continual minor changes to the threshold. Where the load has changed sufficiently to warrant modifying the first threshold, the process moves to process element 39 where the threshold is modified to take account of the change to the load. Otherwise the process terminates without changing the threshold. The processes 3a and 3b will interact, for example, as shown at path 334 in FIG. 3a, process 3b may form part of the NO loop from decision element 33.

Figure 4A:
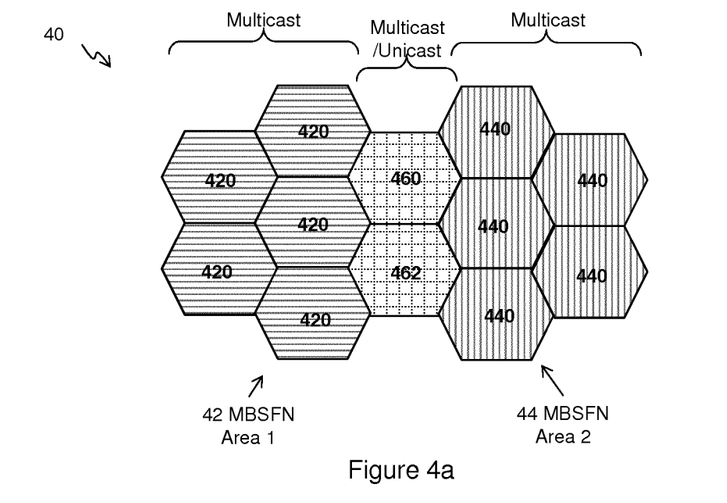
FIGS. 4a, 4b and 4c show mobile communications networks according to embodiments of the disclosure.

FIG. 4a shows a mobile communications network, by way of example, a LTE network 40 comprising a first MBSFN area 42 comprising cells 420 and a second MBSFN area 44 comprising cells 440. First MBSFN area 42 and a second MBSFN area 44 overlap at cells 460 and 462, which form part of both first and second MBSFN areas. Shared cells 460, 462 may be unicast or multicast. The other cells: 420 in first MBSFN area 42 and 440 second MBSFN area 44, are multicast. First MBSFN area 42 therefore comprises multicast cells 420 together with cells 460, 462 and serves a first eMBMS service. Second MBSFN area 44 comprises multicast cells 440 together with cells 460, 462 and serves a second eMBMS service.

Embodiments of the disclosure have application to both sectored and un-sectored cells. In a non-sectored cell, the base station may comprise at least one transceiver for the exchange by transmission and reception of radio signals with one or more mobile terminals. In a sectored cell, a single base station uses multiple transceivers, each transceiver for providing service to a different sector to effectively enhance the signal qualities available to mobile terminals in the base station's coverage area. Each transceiver comprises a directional antenna to transmit and receive signals along different directions. According to an embodiment of the invention, in a sectored cell, different signals may be provided by a single base station via different transceivers.

Figure 4B:
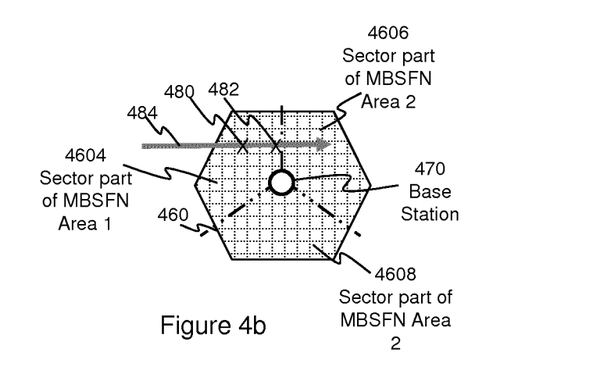

FIG. 4b shows an example implementation relating to sectored cells. Looking at FIG. 4b: a mobile terminal follows a path 484 directly between two sectors 4604, 4606: each sector allocated to a different MBSFN. Path 484 indicates movement of the mobile terminal from a previous cell or sector (not shown) through the current sector 4604 and on to a subsequent sector (which we may refer to as a "target" sector) 4606. As the mobile terminal follows the path 484 in sector 4604 towards location 480, the quality of received reference signal quality (for example, measured using the RSRP) from the sector 4604 transceiver serving the mobile terminal is compared, in a first comparison, with a first threshold value. At location 480 in sector 4604 on path 484, the result of the comparison indicates that the quality of the received signal reaches or passes the first threshold value. Location 480 may occur at different positions along path 484 to that shown, depending on conditions and could, for example occur closer to or further away from the target sector 4606. As the mobile terminal traverses the cell, the quality of the serving signal received from the base station serving that cell will change, increasing at first and then decreasing, e.g. as the mobile initially draws closer to, and then further away from, the base station. According to different embodiments of the disclosure, the switch to unicast may be triggered when the serving signal passes above the threshold or, further along the path, when it falls below the threshold. In response, the base station serving the current sector 4604 changes from multicast/broadcast to unicast, the service provided to the mobile terminal by the current serving (sector 4604) transceiver.

As the mobile terminal follows the path 484 in sector 4604 between location 480 and location 482, the received signal quality from the current serving (sector 4604) transceiver is compared, in a second comparison, with a second threshold value. At location 482 on path 484, which is still in sector 4604 but is further along path 484 than location 480 (i.e. closer to target sector 4606 than location 480), the result of the comparison indicates that the quality of the received signal reaches or passes the second threshold value. In response, the base station serving the current sector 4604 configures the mobile terminal to provide indications of signal quality of multiple signals, including the unicast serving signal received at the mobile terminal and the quality of a second signal received at the mobile terminal from a different (i.e. target) transceiver. Subsequently, comparison of the quality of the monitored multiple signals indicates that a better quality of service would be obtained by transitioning the mobile terminal to being served by another signal. The base station then provides to the mobile terminal instructions to transition to receiving service from a different (i.e. target) transceiver, i.e., in this example, the sector 4606 transceiver.

Figure 4C:
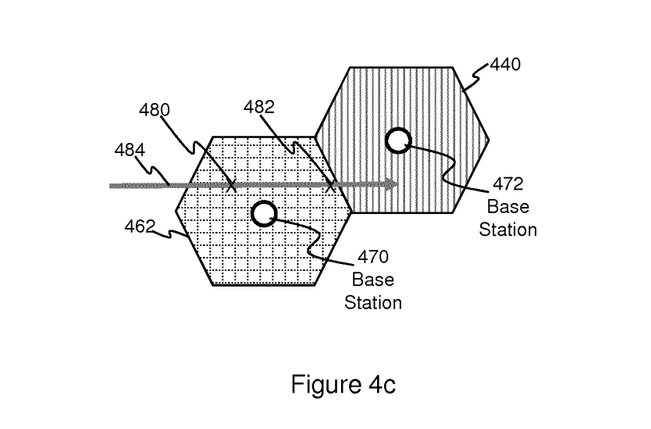

FIG. 4c shows an example implementation relating to un-sectored cells. Looking at FIG. 4c, a mobile terminal follows a path 484 across cell 462. Path 484 indicates movement of the mobile terminal from a previous cell (not shown) through the current cell 462 and on to a subsequent cell (which we may refer to as a "target" cell) 440. As the mobile terminal follows the path 484 in cell 462 towards cell 440, the quality of received reference signal quality (for example, measured using the RSRP) from the cell 462 transceiver serving the mobile terminal is compared, in a first comparison, with a first threshold value. At location 480 in on path 484 in cell 462, the result of the comparison indicates that the quality of the received signal from the base station 470 reaches or passes the first threshold value. This is reported to the base station 470 serving the current cell 462, which changes the service provided to the mobile from multicast to unicast. Location 480 may occur at different positions along path 484 to that shown, depending on conditions and could, for example occur closer to or further away from the target cell 440. As before, according to different embodiments of the invention, the switch to unicast may be triggered when the serving signal passes above the threshold or, further along the path, when it falls below the threshold.

As the mobile terminal follows the path 484 in cell 462 between location 480 and location 482, the received signal quality from the current serving 462 transceiver is compared, in a second comparison, with a second threshold value. At location 482, which is still located in cell 462 but is further along path 484 than location 480 (i.e. closer to target cell 440 than location 480), the result of the comparison indicates that the quality of the received signal from the base station 470 reaches or passes the second threshold value. In response, the base station serving the current cell 462 configures the mobile terminal to provide indications of signal quality of multiple cells including current serving cell 462 and other cells, such as target cell 440. Subsequently, the signal qualities of the multiple cells are compared and, when the comparison of the signal qualities indicates that a selected one of the other cells will provide a better service to the mobile terminal, base station 470 will trigger the transition of the mobile terminal to receiving service from the base station 472 serving the current cell to a base station serving the selected other cell (e.g. base station 472 of target cell 440. FIG. 4c is also relevant to the situation where the mobile terminal is passing from a sector in a first cell direct to a non-sectored cell or to a sector in a different cell.

Figure 5:
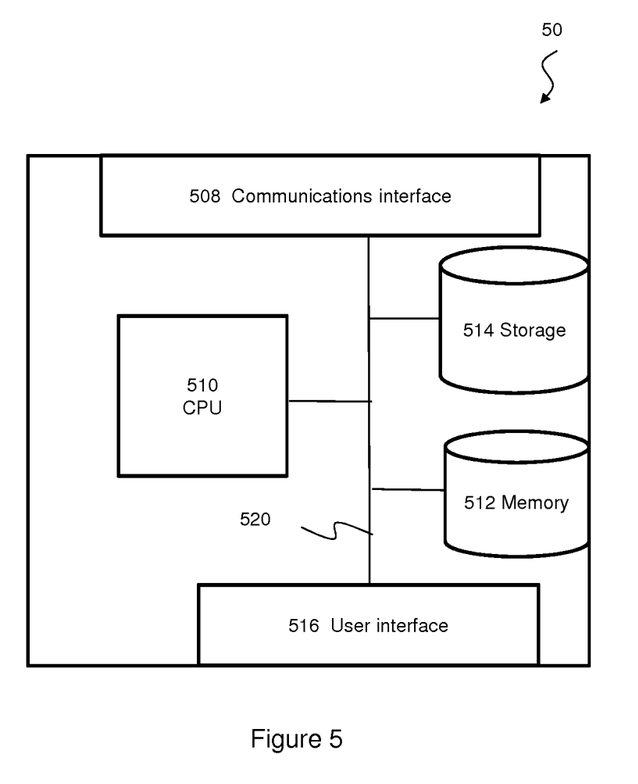
FIG. 5 is a block diagram of a computer system suitable for the operation of embodiments of the present disclosure.

FIG. 5 is a block diagram of a computer system 50 suitable for the operation of embodiments of the present disclosure. A central processor unit (CPU) 510 is communicatively connected to communications interface 508, a memory 512, a storage 514 and an input/output (I/O) interface 516 via a data bus 520. The memory 512 can be any read/write storage device such as a random access memory (RAM) or a non-volatile storage device suitable for storing data for use by processor 512. The storage 514 can be any read-only or read/write storage device such as a random access memory (RAM) or a non-volatile storage device suitable for storing program code for controlling the operation of processor 510. Memory 512 and storage 514 may comprise the same device or devices. An example of a non-volatile storage device includes a disk or tape storage device. The user interface 516 is an interface to devices for the input or output of data provided to or received from a user or operator of computer system 50. Examples of I/O devices connectable to user interface 516 include a keyboard, a mouse, a display (such as a monitor) and a network connection. Communications interface 508 is an interface to other devices and may comprise one or more radio transmit interfaces and one or more wired or wireless core network interfaces.

Embodiments of the present disclosure have application to audio and video broadcasting but also file broadcasting in mobile networks. In addition to mobile networks, embodiments of the present disclosure may also have application to femtocell and small cell deployments, for example, in pre-loading certain content on devices to enhance QoE and optimise use of resources. Similar scenarios may arise for simultaneous software updates on multiple devices. The present invention has been described in an LTE context that could be deployed with existing multicast mobile networks, but the invention can be applied in any multicast mobile network where the network elements have similar roles regarding unicast and multicast service provision.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present disclosure has been described in relation to the above described example embodiments, the invention is not limited thereto and that there are many possible variations and modifications which fall within the scope of the invention. The disclosure is not limited to the use of intra-cell mobility procedures in sectored cells located at MBSFN area boundaries but also in sectored cells at other locations where switching to unicast prior to transitioning to a different cell may reduce or avoid service interruption.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

According to an embodiment of the disclosure, one or both threshold is calculated by the base station and fed to the mobile terminal, which carries out the comparisons and provides the results to the serving base station. According to an embodiment of the disclosure, the serving base station instructs the mobile terminal to provide measurement reports on signals received from the transceivers of the serving base station and from transceivers of base stations in neighboring sectors or cells as it traverses the sector or cell and the serving base station applies the threshold values to the measurements it receives and carries out the comparisons. According to an embodiment of the disclosure, each criterion relates to a different threshold relating to the same, signal-quality-related parameter.

As set out in the abstract, the disclosure relates to a method of operating a mobile communications network comprising a plurality of base stations and a base station for a mobile communications network, in which the base station comprises a plurality of transmitters, a plurality of receivers and a processor. Each transmitter is configured to transmit radio signals to a plurality of mobile terminals. Each receiver is configured to receive radio signals from a plurality of mobile terminals. The processor is configured to serve a mobile terminal via the transmitter over multicast/broadcast across a radio link; receive information from the mobile terminal being served by the transmitter, in which the information derives from signal quality of a multicast/broadcast serving signal received at the mobile terminal from the transmitter; and provide to the mobile terminal first instructions based on a first comparison of the quality of the multicast/broadcast serving signal received at the mobile terminal. The comparison is based on a first threshold; in which the first instructions instruct the mobile terminal to switch to unicast; and in which the processor is further configured to vary the first threshold in dependence on a measure of loading of the network.

The invention claimed is:

1. A method of operating a mobile communications network comprising a plurality of base stations, each base station comprising at least one transceiver, wherein a first transceiver is comprised in a first base station, the method comprising:
   operating the first transceiver to:
      serve a mobile terminal over multicast/broadcast across a network;
      receive information from the mobile terminal being served by the transceiver, wherein the information derives from signal quality of a multicast/broadcast serving signal received at the mobile terminal from the first transceiver; and
      provide to the mobile terminal first instructions based on a first comparison of the quality of the multicast/broadcast serving signal received at the mobile terminal, wherein the first comparison is based on a first threshold;
   wherein the first instructions instruct the mobile terminal to switch to unicast, and
   wherein the method further comprises varying the first threshold in dependence on a measure of loading of the network.

2. The method of claim 1, wherein the method further comprises:
   receiving further information from the mobile terminal being served by the first transceiver, wherein the further information derives from signal quality of a unicast serving signal received at the mobile terminal from the first transceiver; and
   providing to the mobile terminal second instructions based on a second comparison of the quality of the unicast serving signal received at the mobile terminal, wherein the second comparison is based on a second threshold, and wherein the second instructions instruct the mobile terminal to monitor signal quality of signals received from a second transceiver.

3. The method of claim 2, wherein the method further comprises varying the second threshold in dependence on a measure of loading of the network.

4. The method of claim 3, wherein the method further comprises:
- receiving further information from the mobile terminal being served by the first transceiver, wherein the further information derives from the signal quality of a unicast serving signal received at the mobile terminal from the first transceiver and the signal quality of a second signal received at the mobile terminal from a second transceiver;
- and providing to the mobile terminal third instructions based on a third comparison of the quality of the unicast serving signal received at the mobile terminal and the quality of the second signal received at the mobile terminal;
- wherein the third instructions instruct the mobile terminal to transition to being served by the second transceiver.

5. The method of claim 2, further comprising varying at least one of the first threshold or the second threshold based on detected conditions on a communications channels between the base station and the mobile terminal.

6. The method of claim 2, wherein the mobile terminal is in motion relative to the at least one transceiver, wherein a distance between the mobile terminal and the second transceiver at a point of providing to the mobile terminal the first instruction is greater than a distance between the mobile terminal and the second transceiver at a point of providing to the mobile terminal the second instruction.

7. The method of claim 2, wherein the first and second transceivers are comprised in a single base station.

8. The method of claim 1, wherein, upon detecting an increase in the loading of the network, varying the first threshold so as to reduce a rate at which mobile terminals served by the first base station are switched to unicast.

9. The method of claim 1, wherein, upon detecting a decrease in the loading of the network, varying the first threshold so as to increase a rate at which mobile terminals served by the first base station are switched to unicast.

10. The method of claim 1, wherein the network loading comprises at least one of. a radio resource usage load at the first transceiver, or traffic levels on radio frequencies between the first transceiver and at least one mobile terminal.

11. The method of claim 1, wherein providing the first instructions to the mobile terminal is triggered when the quality of the multicast/broadcast serving signal received at the mobile terminal changes from being equal to or less than the first threshold to being greater than the first threshold.

12. The method of claim 1, wherein providing the first instructions to the mobile terminal is triggered when the quality of the multicast/broadcast serving signal received at the mobile terminal changes from being greater than the first threshold to being equal to or less than the first threshold.

13. A base station for a mobile communications network, the base station comprising:
- a plurality of transmitters, each transmitter configured to transmit radio signals to a plurality of mobile terminals;
- a plurality of receivers, each receiver configured to receive radio signals from a plurality of mobile terminals; and
- a processor configured to:
  - serve a mobile terminal over multicast/broadcast across a radio link,
  - receive information from the mobile terminal being served by the transmitter, wherein the information derives from signal quality of a multicast/broadcast serving signal received at the mobile terminal from the transmitter, and
  - provide to the mobile terminal first instructions based on a first comparison of the quality of the multicast/broadcast serving signal received at the mobile terminal, wherein the comparison is based on a first threshold;
- wherein the first instructions instruct the mobile terminal to switch to unicast, and wherein the processor is further configured to vary the first threshold in dependence on a measure of loading of the network.

* * * * *

UNITED STATES PATENT AND TRADEMARK OFFICE
CERTIFICATE OF CORRECTION

PATENT NO. : 11,477,700 B2
APPLICATION NO. : 16/085328
DATED : October 18, 2022
INVENTOR(S) : Richard MacKenzie It is certified that error appears in the above-identified patent and that said Letters Patent is hereby corrected as shown below:

In the Specification

In Column 1, Line 32, delete "Service (eMBMS)" and insert -- Services (eMBMS) --, therefor.

In Column 2, Line 38, delete "the a second" and insert -- a second --, therefor.

In Column 4, Line 52, delete "transport network load (TNL)" and insert -- transport network layer (TNL) --, therefor.

In Column 7, Line 10, delete "invention," and insert -- disclosure, --, therefor.

In Column 8, Line 19, delete "invention," and insert -- disclosure, --, therefor.

In Column 8, Line 55, delete "processor 512." and insert -- processor 510. --, therefor.

In Column 9, Line 10, delete "optimise" and insert -- optimize --, therefor.

In Column 9, Line 12, delete "invention" and insert -- disclosure --, therefor.

In Column 9, Line 14, delete "invention" and insert -- disclosure --, therefor.

In Column 9, Line 24, delete "invention." and insert -- disclosure. --, therefor.

In Column 9, Line 39, delete "invention." and insert -- disclosure. --, therefor.

In Column 9, Line 43, delete "invention" and insert -- disclosure --, therefor.

In Column 9, Line 45, delete "invention." and insert -- disclosure. --, therefor.

Signed and Sealed this
Eighteenth Day of April, 2023

Katherine Kelly Vidal
*Director of the United States Patent and Trademark Office*

In the Claims

In Column 11, Claim 4, Line 13, delete "and" and insert the same at Line 12, after "transceiver;" as a continuation point.

In Column 12, Claim 10, Line 2, delete "of." and insert -- of: --, therefor.